United States Patent
Wu

(10) Patent No.: US 6,769,341 B2
(45) Date of Patent: Aug. 3, 2004

(54) SHEET CUTTING DEVICE

(75) Inventor: Cheng-Yen Wu, Pingtung Hsien (TW)

(73) Assignee: Patta International Limited, Pingtung (TW)

( * ) Notice: Subject to any disclaimer, the term of this patent is extended or adjusted under 35 U.S.C. 154(b) by 0 days.

(21) Appl. No.: 10/256,431

(22) Filed: Sep. 27, 2002

(65) Prior Publication Data

US 2004/0060415 A1 Apr. 1, 2004

(51) Int. Cl.[7] .......................... B26D 1/06; B26B 29/06
(52) U.S. Cl. ........................ 83/693; 83/916; 30/289; 30/228; 30/241
(58) Field of Search ................. 83/693, 613, 697, 83/692, 109, 164, 916, 440.1; 30/228, 241, 282, 289, 293, 294; 409/180; 408/69, 70, 71

(56) References Cited

U.S. PATENT DOCUMENTS

| | | | | |
|---|---|---|---|---|
| 2,364,334 A | * | 12/1944 | Wold | 83/165 |
| 2,680,292 A | * | 6/1954 | Kaufmann | 30/228 |
| 3,025,600 A | * | 3/1962 | Leibinger | 30/241 |
| 3,212,541 A | * | 10/1965 | Burrows et al. | 144/134.1 |
| 3,847,049 A | * | 11/1974 | Bitzel | 83/613 |
| 3,861,037 A | * | 1/1975 | Smith et al. | 30/228 |
| 3,903,772 A | * | 9/1975 | Wickens | 83/146 |
| 4,312,256 A | * | 1/1982 | Herzog et al. | 83/694 |
| 4,748,744 A | * | 6/1988 | Turner | 83/694 |

* cited by examiner

Primary Examiner—Boyer Ashley
Assistant Examiner—Thomas J Druan, Jr.
(74) Attorney, Agent, or Firm—William E. Pelton, Esq.

(57) ABSTRACT

A cutting device has a body, a driving device, a moving base, a head and a cutting rod. The driving device is mounted on the body to actuate the moving base to move relative to the body. The head extends from the body and has a central hole defined through the head. A notch and an exhaust hole are defined in the bottom of the head and communicate with the central hole. The cutting rod is moveably received in the central hole in the head and is attached to the moving base. The cutting rod has a cutting recess defined around the cutting rod. Accordingly, the metal waste generated during the cutting process is kept from flying about and injuring the user, so the safety of using the cutting device is improved. In addition, the cut metal sheet can be kept from shake or vibration.

5 Claims, 4 Drawing Sheets

SHEET CUTTING DEVICE

BACKGROUND OF THE INVENTION

1. Field of the Invention

The present invention relates to a cutting device, and more particularly to a sheet cutting device that can improve the safety of using the cutting device.

2. Description of Related Art

A conventional cutting device substantially comprises a knife and a driving device. The knife has multiple teeth formed on the periphery or one side of the knife. The driving device drives the knife to rotate or move in reciprocation so that the knife will provide a cutting effect to an object such as a metal sheet.

However, the area of contact between the sheet and the knife of the conventional cutting device is exposed waste metal generated during the cutting process will fly about and may injure the user. Thus, the user must always wear safety gear such as a safety coat, mask and so on for protection from the flying waste. However, in practice it is found that such gear is uncomfortable, as well as it being impossible to completely protect every part of an operator's body. Thus, the use of the conventional cutting device is not safe and is inconvenient.

In addition, the contact area between the sheet and the knife of the conventional is not supported, whereby shake or vibration easily occurs during the cutting process, leading to rough edges on the cut edge of the metal sheet. It is clear that the cutting quality of the conventional cutting device is poor.

To overcome the shortcomings, the present invention tends to provide a cutting device to mitigate or obviate the aforementioned problems.

SUMMARY OF THE INVENTION

The main objective of the invention is to provide a cutting device for a sheet material with improved safety in using the cutting device and elimination of excessive shake or vibration of the sheet. The cutting device has a body, a driving device, a moving base, a head and a cutting rod. The driving device is mounted on the body to actuate the base to move in reciprocation relative to the body. The head extends from the body and has a central hole defined through the head and corresponding to the moving base. A notch is defined in the bottom of the head and communicates with the central hole, and the notch extends to two opposite sides of the head so as to form a neck on a top of the head. An exhaust hole is defined in the bottom of the head and communicates with the central hole. The cutting rod is moveably received in the central hole in the head and is attached to the moving base. The cutting rod has a cutting recess defined around the cutting rod at a position corresponding to the notch in the head and selectively corresponding to the exhaust hole in the head while the cutting rod is actuated to move with the moving base by the driving device. The cutting recess has a cutting edge defined in the inner surface at one end far from the moving base. Accordingly, the metal waste generated during the cutting process will be stored in the head and will be exhausted from the exhaust hole in the head. This can keep the metal waste from flying about and injuring the user, so the safety of using the cutting device is improved.

Other objects, advantages and novel features of the invention will become more apparent from the following detailed description when taken in conjunction with the accompanying drawings.

DETAILED DESCRIPTION OF PREFERRED EMBODIMENT

Figure 1:
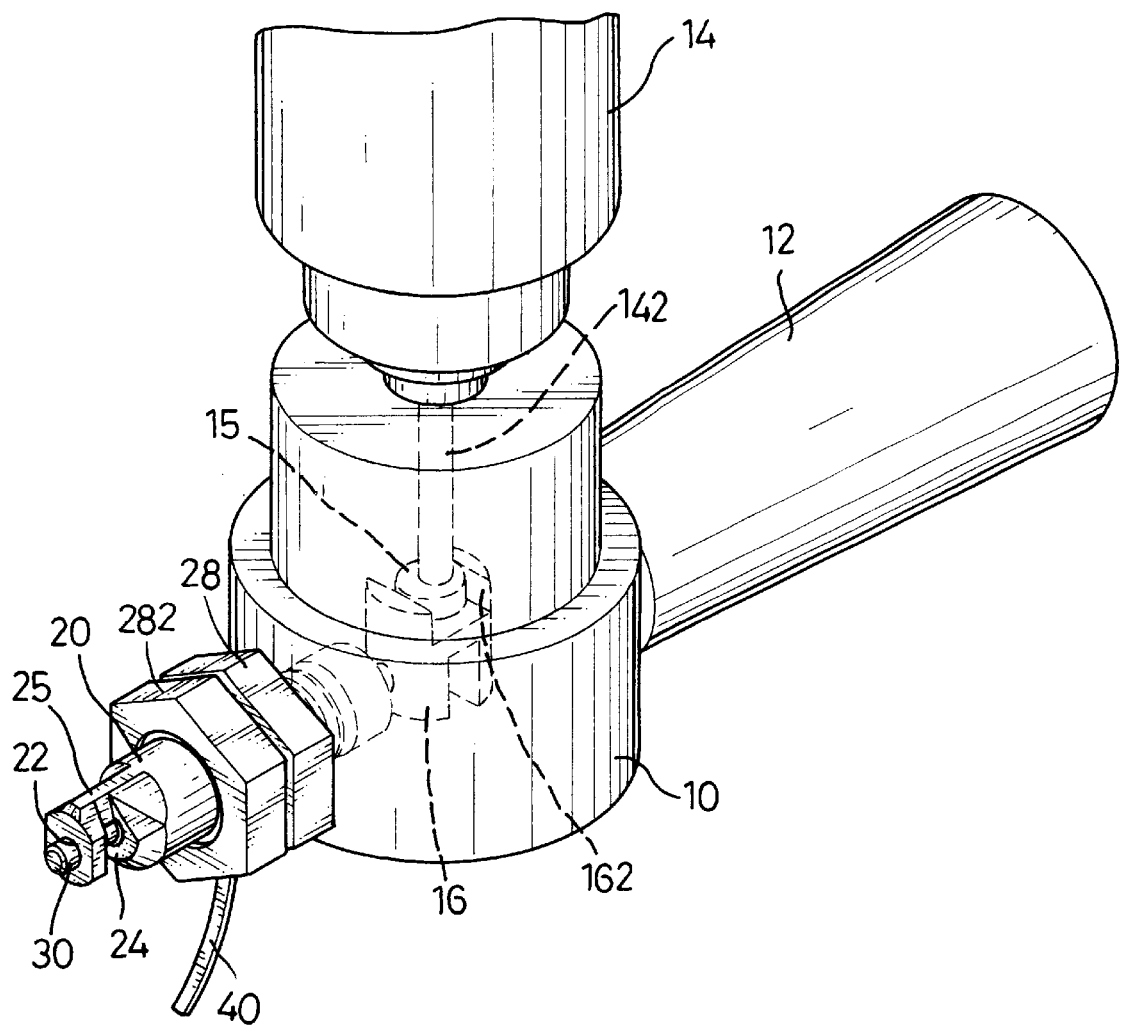
FIG. 1 is a perspective view of a cutting device in accordance with the present invention.
Figure 2:
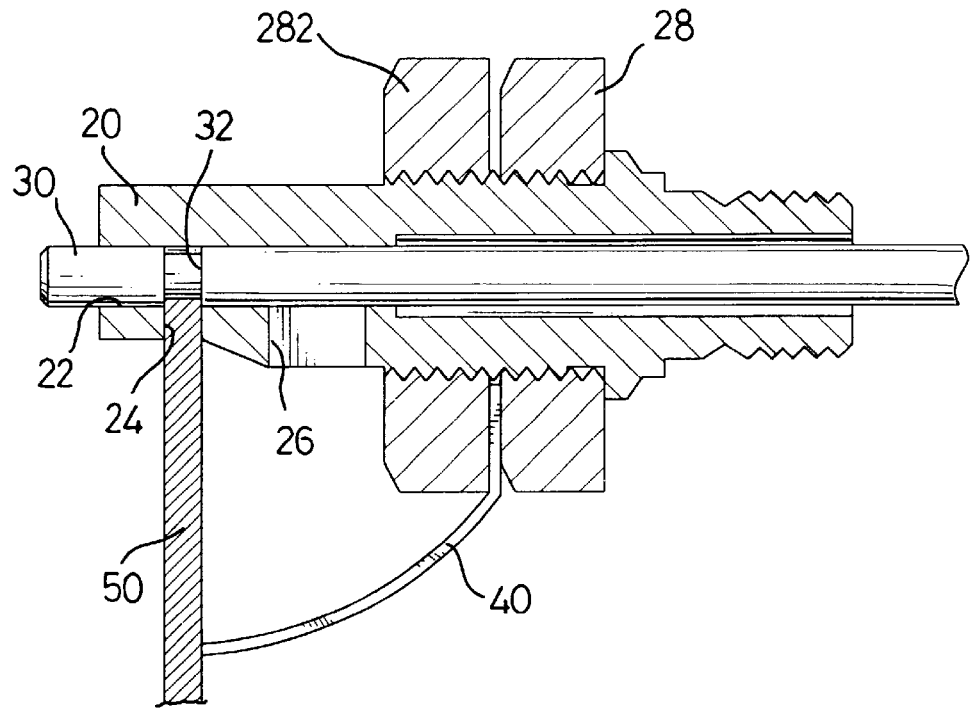
FIG. 2 is a side plan view in partial cross section of the cutting device in FIG. 1.
Figure 4:
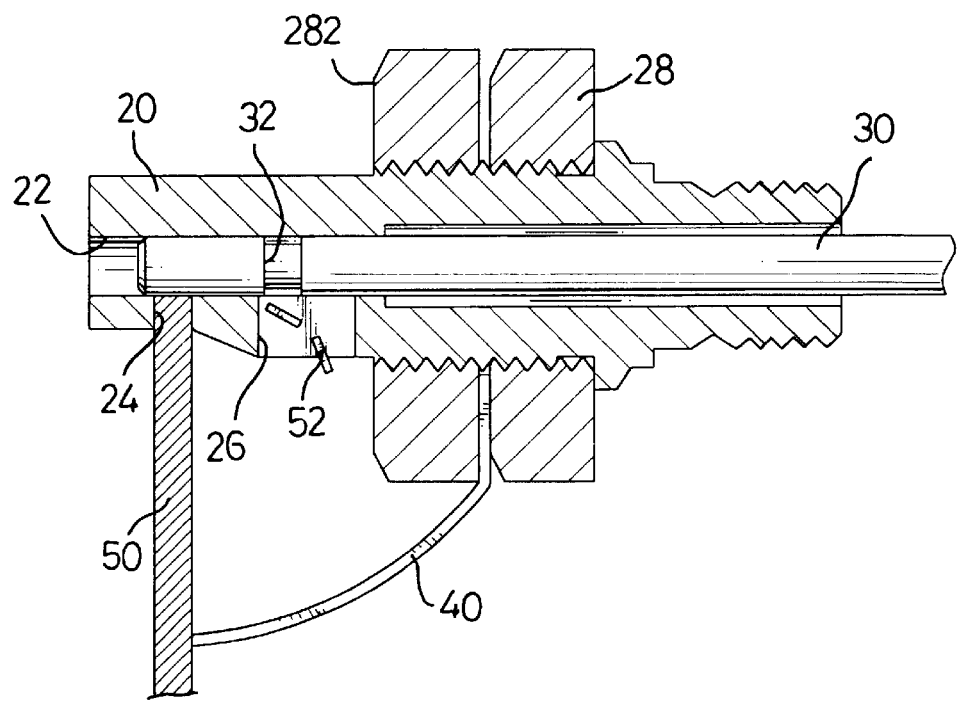
FIG. 4 is an operational side plan view in partial cross section of the cutting device in FIG. 1 showing that the cutting rod moves to a position at where the metal waste is exhausted from the exhaust hole in the head.
Figure 3:
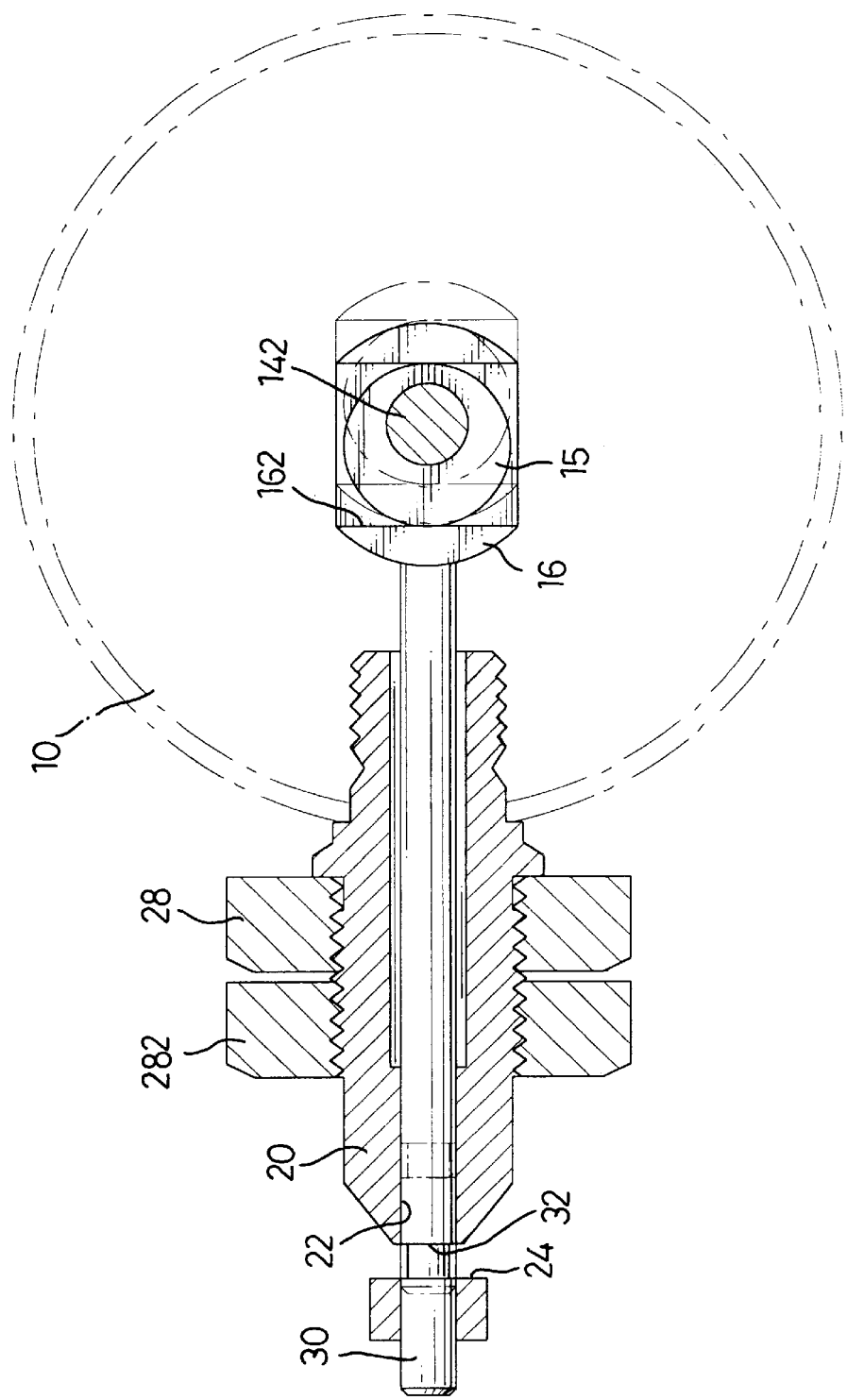
FIG. 3 is an operational top plan view in partial cross section of the cutting device in FIG. 1.

With reference to FIGS. 1 and 2, a cutting device in accordance with the present invention comprises a body (10), a driving device, a moving base (16), a head (20) and a cutting rod (30). The driving device is mounted on the body (10) to actuate the moving base (16) to move in the body (10). The driving device comprises a motor (14) and a cam (15). The motor (14) is attached to the body (10) and has a rotating shaft (142) extending into the body (10). The cam (15) is attached to the shaft (142) and has a protrusion formed on the periphery of the cam (15). A recess (162) is defined in the top of the moving base (16) for rotatably receiving the cam (15), and the recess (162) has two inner ends abutting the cam (15). Accordingly, when the motor (14) is switched on, with reference to FIG. 3, the cam (15) will rotate with the shaft (142) of the motor (14) in the recess (162) of the moving base (16). Consequently, the moving base (16) will be actuated to move relative to the body (10) in reciprocation.

The head (20) extends from the body (10) along the travel direction of the moving base (16). A central hole (22) is defined through the head (20) and corresponds to the moving base (16). In practice, a thread hole is defined in the body (10), and a thread is formed on one end of the head (20) to be screwed into the thread hole in the body (10). Accordingly, the head (20) is securely attached to the body (10) by means of the engagement between the thread on the head (20) and the threaded hole in the body (10).

A notch (24) is defined in the bottom of the head (20) and communicates with the central hole (22). The notch (24) in the head (20) extends to two opposite sides of the head (20) so as to form a neck (25) on the top of the head (20). An exhaust hole (26) is defined in the bottom of the head (20) and communicates with the central hole (22).

The cutting rod (30) is moveably received in the central hole (22) in the head (20) and is attached to the moving base (16), such that the cutting rod (30) can move with the moving base (16) along the central hole (22) in the head (20). The cutting rod (30) has a cutting recess (32) defined around the cutting rod (30) at a position corresponding to the notch (24) in the head (20). In a first embodiment, the cutting recess (32) has a cross section with a rectangular shape. The cutting recess (32) has a cutting edge defined in the inner surface at one end far from the moving base (16). In addition, the diameter of the cutting rod (30) is not smaller than the width of the neck (25) on the head (20).

A handle (12) is mounted on the body (10) at a position far from the head (20), such that the user can control and use the cutting device by means of holding the handle (12). A supporting bar (40) is detachably attached to the head (20) and is adapted to abut a sheet material (50). In practice, the head (20) has a thread portion formed on the head (20), and two nuts (28,282) are screwed onto the thread portion on the head (20) to sandwich one end of the supporting bar (40) so as to detachably attach the supporting bar (40) to the head (20).

In operation, with reference to FIGS. 1 to 4, the notch (24) in the head (20) is put onto an edge of a metal sheet (50), and the motor (14) is switched on. The moving base (16) will be actuated to move relative to the body (10) by means of the transmission of the cam (15). The cutting rod (30) will move with the moving base (16) along the central hole (22) in the head (20). Consequently, the cutting edge of the cutting recess (32) in the cutting rod (30) will cut off the edge of the metal sheet (50) extending into the notch (24). The metal waste (52) cut off from the metal sheet (50) will be stored in the cutting recess (32). The metal waste (52) will be exhausted from the exhaust hole (26) while the cutting rod (30) moves to a position where the cutting recess (32) aligns with the exhaust hole (26).

When the cutting rod (30) move to an original position where the cutting recess (32) aligns with the notch (24) as shown in FIG. 2, the edge of the metal sheet (50) will enter the cutting recess (32). The edge of the metal sheet (50) will be cut off when the cutting rod (30) moves backward, such that a channel is cut and defined in the metal sheet (50). Because the notch (24) extends to two opposite sides of the head (20) to form a neck (25) on the top of the head (20), the two parts of the metal sheet (50) at two sides of the channel will extend through two sides of the notch (24). Accordingly, a channel with a desired shape, such as a straight line, a circle or a curved line and so on, can be cut and defined in the metal sheet (50) with the cutting device.

Because the metal waste (52) is received in the cutting recess (32) and are exhausted from the exhaust hole (26) in the bottom of the head (20), the metal waste (52) will not fly about and will not injure the user. The safety of using the cutting device is improved. Because the edge of the metal sheet (50) enters into the notch (24) and is engaged by the head (20) between two ends of the notch (24), the notch (24) can provide a supporting effect to the metal sheet (50), thereby significantly reducing any vibration otherwise being generated during the cutting process. Furthermore, a further supporting effect is provided by means of the abutment between the free end of the supporting bar (40) and the metal sheet (50). This can keep the metal sheet (50) from shake or vibration during the cutting process, such that a rough cut edge on the metal sheet (50) is avoided. The cutting quality of the cutting device is improved. In addition, the free end of the supporting bar (40) can serve as a center when a circle channel is defined in the metal sheet (50) with the cutting device.

Figure 5:
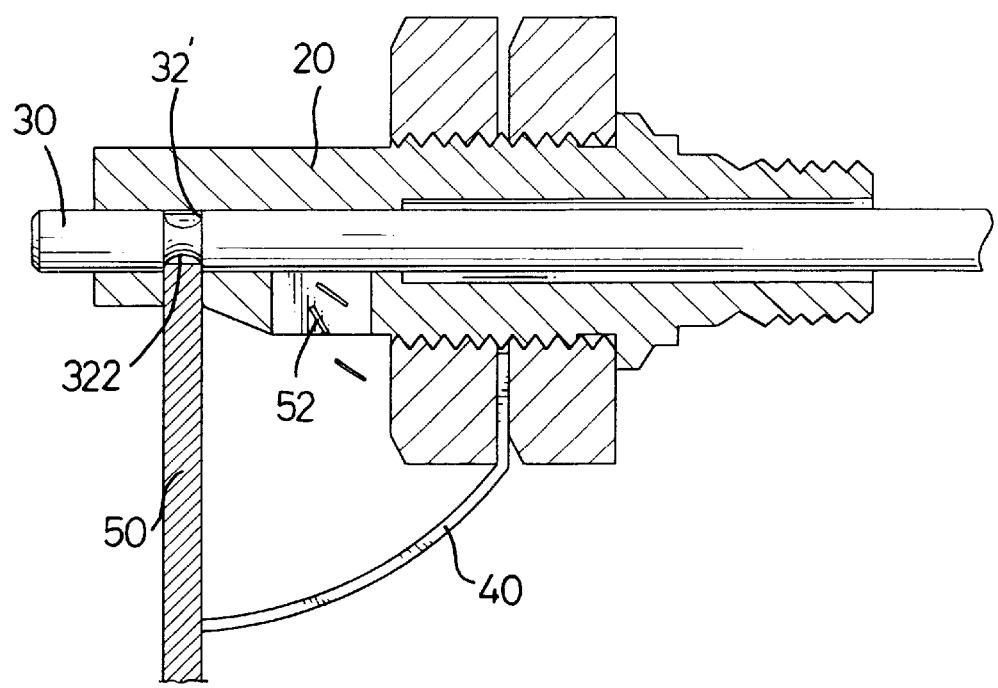
FIG. 5 is a side plan view in partial cross section of another embodiment of a cutting rod of the cutting device in FIG. 1.

With reference to FIG. 5, the cutting recess (32') in the cutting rod (30) has a concave bottom (322), such that the space for receiving the metal waste occurring during the cutting process is enlarged.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutting device for cutting a sheet material comprising:

a body;

a driving device mounted on the body;

a moving base actuated by the driving device and mounted in the body to reciprocate relative to the body;

a head extending from the body and having a central hole defined through the head and corresponding to the moving base, a notch defined in a bottom of the head and communicating with the central hole, and an exhaust hole defined in the bottom of the head and communicating with the central hole;

a cutting rod moveably received in the central hole in the head and attached to the moving base, the cutting rod having a cutting recess defined around the cutting rod at a position corresponding to the notch in the head and selectively corresponding to the exhaust hole in the head while the cutting rod is actuated to move with the moving base by the driving device, and the cutting recess having a cutting edge defined in an inner surface at one end aligned with the notch in the head far from the moving base; and a supporting a bar detachably attached to the head and having a free end for abutting the sheet material, wherein the notch in the head extending to two opposite sides of the head so as to form a neck on a top of the head having a width not larger than a diameter of the cutting rod;

a thread portion formed on the head; and two nuts screwed onto the thread portion releasably to squeeze one end of the supporting bar therebetween.

2. The cutting device as claimed in claim 1 further comprising a handle mounted on the body at a position far from the head.

3. The cutting device as claimed in claim 1, wherein the cutting recess in the cutting rod has a cross section with a rectangular shape.

4. The cutting device as claimed in claim 1, wherein the cutting recess in rod has a concave bottom.

5. The cutting device as claimed in claim 1, wherein the driving device comprises:

a motor attached to the body and having a rotating shaft extending into the body;

a cam attached to the shaft and having a protrusion formed on a periphery of the cam; and a recess defined in a top of the base for rotatably receiving the cam such that the base will move relative to the body in reciprocation by means of the transmission of the cam.

* * * * *